(12) United States Patent
Wilkins et al.

(10) Patent No.: US 8,326,075 B2
(45) Date of Patent: Dec. 4, 2012

(54) SYSTEM AND METHOD FOR VIDEO ENCODING USING ADAPTIVE LOOP FILTER

(75) Inventors: Paul Wilkins, Cambridge (GB); James Bankoski, North Greenbush, NY (US); Yaowu Xu, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 1033 days.

(21) Appl. No.: 12/329,070

(22) Filed: Dec. 5, 2008

(65) Prior Publication Data

US 2010/0061645 A1 Mar. 11, 2010

Related U.S. Application Data

(60) Provisional application No. 61/096,147, filed on Sep. 11, 2008.

(51) Int. Cl.
 G06K 9/40 (2006.01)
 H04N 1/32 (2006.01)
 H04N 1/41 (2006.01)
(52) U.S. Cl. .................................. 382/268; 358/426.01
(58) Field of Classification Search .................. None
 See application file for complete search history.

(56) References Cited

U.S. PATENT DOCUMENTS

| | | | |
|---|---|---|---|
| 3,825,832 A | 7/1974 | Frei et al. | |
| 4,719,642 A | 1/1988 | Lucas | |
| 4,729,127 A | 3/1988 | Chan et al. | |
| 4,736,446 A | 4/1988 | Reynolds et al. | |
| 4,868,764 A | 9/1989 | Richards | |
| 4,891,748 A | 1/1990 | Mann | |
| 5,068,724 A | 11/1991 | Krause et al. | |
| 5,083,214 A | 1/1992 | Knowles | |
| 5,091,782 A | 2/1992 | Krause et al. | |
| 5,136,371 A | 8/1992 | Savatier et al. | |
| 5,136,376 A | 8/1992 | Yagasaki et al. | |
| 5,164,819 A | 11/1992 | Music | |
| 5,270,812 A | 12/1993 | Richards | |
| 5,274,442 A | 12/1993 | Murakami et al. | |

(Continued)

FOREIGN PATENT DOCUMENTS

EP 1555832 7/2005

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Randolph I Chu
(74) *Attorney, Agent, or Firm* — Young Basile Hanlon & MacFarlane, P.C.

(57) ABSTRACT

Methods for decoding frames of compressed video information are disclosed. Each frame includes a plurality of blocks having a prediction stage parameter and a residual error attribute. One method includes categorizing each of the blocks into categories based on at least one of the prediction stage parameter or the residual error attribute, determining a loop filter strength value to each of the categories, and filtering the boundary adjacent to at least one of the blocks using the loop filter strength assigned to the category in which that block is categorized.

24 Claims, 6 Drawing Sheets

U.S. PATENT DOCUMENTS

| | | | |
|---|---|---|---|
| 5,278,647 A | 1/1994 | Hingorani et al. | |
| 5,313,306 A | 5/1994 | Kuban et al. | |
| 5,341,440 A | 8/1994 | Earl et al. | |
| 5,432,870 A | 7/1995 | Schwartz | |
| 5,457,780 A | 10/1995 | Shaw et al. | |
| 5,488,570 A | 1/1996 | Agarwal | |
| 5,537,440 A | 7/1996 | Eyuboglu et al. | |
| 5,561,477 A | 10/1996 | Polit | |
| 5,576,767 A | 11/1996 | Lee et al. | |
| 5,579,348 A * | 11/1996 | Walker et al. | 375/355 |
| 5,589,945 A | 12/1996 | Abecassis | |
| 5,623,308 A | 4/1997 | Civanlar et al. | |
| 5,629,736 A | 5/1997 | Haskell et al. | |
| 5,640,208 A | 6/1997 | Fujinami | |
| 5,659,539 A | 8/1997 | Porter et al. | |
| 5,696,869 A | 12/1997 | Abecassis | |
| 5,721,822 A | 2/1998 | Agarwal | |
| 5,734,744 A | 3/1998 | Wittenstein et al. | |
| 5,737,020 A | 4/1998 | Hall et al. | |
| 5,748,247 A | 5/1998 | Hu | |
| 5,774,593 A | 6/1998 | Zick et al. | |
| 5,793,647 A | 8/1998 | Hageniers et al. | |
| 5,818,969 A | 10/1998 | Astle | |
| 5,828,370 A | 10/1998 | Moeller et al. | |
| 5,903,264 A | 5/1999 | Moeller et al. | |
| 5,929,940 A | 7/1999 | Jeannin | |
| 5,930,493 A | 7/1999 | Ottesen et al. | |
| 5,963,203 A | 10/1999 | Goldberg et al. | |
| 5,999,641 A | 12/1999 | Miller et al. | |
| 6,014,706 A | 1/2000 | Cannon et al. | |
| 6,041,145 A | 3/2000 | Hayashi et al. | |
| 6,061,397 A | 5/2000 | Ogura | |
| 6,084,908 A | 7/2000 | Chiang et al. | |
| 6,100,940 A | 8/2000 | Dieterich | |
| 6,108,383 A | 8/2000 | Miller et al. | |
| 6,112,234 A | 8/2000 | Leiper | |
| 6,115,501 A | 9/2000 | Chun et al. | |
| 6,119,154 A | 9/2000 | Weaver et al. | |
| 6,125,144 A | 9/2000 | Matsumura et al. | |
| 6,141,381 A | 10/2000 | Sugiyama | |
| 6,167,164 A | 12/2000 | Lee | |
| 6,181,822 B1 | 1/2001 | Miller et al. | |
| 6,185,363 B1 | 2/2001 | Dimitrova et al. | |
| 6,188,799 B1 | 2/2001 | Tan et al. | |
| 6,240,135 B1 | 5/2001 | Kim | |
| 6,292,837 B1 | 9/2001 | Miller et al. | |
| 6,327,304 B1 | 12/2001 | Miller et al. | |
| 6,370,267 B1 | 4/2002 | Miller et al. | |
| 6,400,763 B1 | 6/2002 | Wee | |
| 6,414,995 B2 | 7/2002 | Okumura et al. | |
| 6,418,166 B1 | 7/2002 | Wu et al. | |
| 6,434,197 B1 | 8/2002 | Wang et al. | |
| 6,522,784 B1 | 2/2003 | Zlotnick | |
| 6,529,638 B1 | 3/2003 | Westerman | |
| 6,560,366 B1 | 5/2003 | Wilkins | |
| 6,687,303 B1 | 2/2004 | Ishihara | |
| 6,697,061 B1 | 2/2004 | Wee et al. | |
| 6,707,952 B1 | 3/2004 | Tan et al. | |
| 6,765,964 B1 | 7/2004 | Conklin | |
| 6,798,837 B1 | 9/2004 | Uenoyama et al. | |
| 6,826,229 B2 | 11/2004 | Kawashima et al. | |
| 6,907,079 B2 | 6/2005 | Gomila et al. | |
| 6,934,419 B2 | 8/2005 | Zlotnick | |
| 6,985,526 B2 | 1/2006 | Bottreau et al. | |
| 6,987,866 B2 | 1/2006 | Hu | |
| 7,027,654 B1 | 4/2006 | Ameres et al. | |
| 7,116,831 B2 | 10/2006 | Mukerjee et al. | |
| 7,170,937 B2 | 1/2007 | Zhou | |
| 7,194,036 B1 * | 3/2007 | Melanson | 375/247 |
| 7,226,150 B2 | 6/2007 | Yoshimura et al. | |
| 7,236,524 B2 | 6/2007 | Sun et al. | |
| 7,330,509 B2 | 2/2008 | Lu et al. | |
| 7,358,881 B2 * | 4/2008 | Melanson | 341/144 |
| 7,499,492 B1 | 3/2009 | Ameres et al. | |
| 7,751,514 B2 * | 7/2010 | Tsuie et al. | 375/350 |
| 2002/0064228 A1 | 5/2002 | Sethuraman et al. | |
| 2002/0168114 A1 | 11/2002 | Valente | |
| 2003/0023982 A1 | 1/2003 | Lee et al. | |
| 2003/0189982 A1 | 10/2003 | MacInnis | |
| 2004/0120400 A1 | 6/2004 | Linzer | |
| 2004/0179610 A1 | 9/2004 | Lu et al. | |
| 2004/0181564 A1 * | 9/2004 | MacInnis et al. | 708/322 |
| 2004/0228410 A1 | 11/2004 | Ameres et al. | |
| 2004/0240556 A1 | 12/2004 | Winger et al. | |
| 2005/0013494 A1 | 1/2005 | Srinivasan et al. | |
| 2005/0053294 A1 | 3/2005 | Mukerjee et al. | |
| 2005/0117653 A1 | 6/2005 | Sankaran | |
| 2005/0147165 A1 | 7/2005 | Yoo et al. | |
| 2005/0169374 A1 | 8/2005 | Marpe et al. | |
| 2005/0196063 A1 * | 9/2005 | Guangxi et al. | 382/261 |
| 2005/0265447 A1 | 12/2005 | Park | |
| 2005/0276323 A1 | 12/2005 | Martemyanov et al. | |
| 2005/0276327 A1 | 12/2005 | Lee et al. | |
| 2006/0062311 A1 | 3/2006 | Sun et al. | |
| 2006/0098737 A1 | 5/2006 | Sethuraman et al. | |
| 2006/0126962 A1 * | 6/2006 | Sun | 382/268 |
| 2006/0153301 A1 | 7/2006 | Guleryuz | |
| 2006/0182181 A1 | 8/2006 | Lee et al. | |
| 2006/0215758 A1 | 9/2006 | Kawashima | |
| 2006/0239345 A1 | 10/2006 | Taubman et al. | |
| 2007/0009044 A1 | 1/2007 | Tourapis et al. | |
| 2007/0025448 A1 | 2/2007 | Cha et al. | |
| 2007/0047648 A1 | 3/2007 | Tourapis et al. | |
| 2007/0140342 A1 | 6/2007 | Karczewicz et al. | |
| 2007/0177673 A1 | 8/2007 | Yang | |
| 2007/0189735 A1 | 8/2007 | Kawashima et al. | |
| 2007/0201559 A1 | 8/2007 | He | |
| 2007/0237241 A1 | 10/2007 | Ha et al. | |
| 2007/0253490 A1 | 11/2007 | Makino | |
| 2007/0253491 A1 | 11/2007 | Ito et al. | |
| 2007/0274385 A1 | 11/2007 | He | |
| 2008/0025398 A1 | 1/2008 | Molloy et al. | |
| 2008/0025411 A1 | 1/2008 | Chen et al. | |
| 2008/0170629 A1 | 7/2008 | Shim et al. | |
| 2008/0212678 A1 | 9/2008 | Booth et al. | |
| 2009/0287493 A1 * | 11/2009 | Janssen et al. | 704/500 |

FOREIGN PATENT DOCUMENTS

| | | |
|---|---|---|
| EP | 1838108 A1 | 9/2007 |
| KR | 10-2005-0018730 | 2/2005 |
| KR | 10-2008-0056083 | 6/2008 |
| WO | 2002089487 A2 | 11/2002 |
| WO | 2006062377 A1 | 6/2006 |
| WO | 2006083614 A2 | 8/2006 |
| WO | 2007052303 A2 | 5/2007 |
| WO | 2008005124 A2 | 1/2008 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.

Architectures for Efficient Partitioning of Video Coding Algorithms—H. 264 decoder, Nov. 2006.

Wenger et al.; RTP Payload Format for H.264 Video; The Internet Society; 2005.

A High Efficient Method for Parallelizing Reconstructor & Loop Deblocking Filter on Multi-core Processor Platform, Feb. 2008.

Lihua Zhu, Guangfei Zhu, Charles Wang; Implementation of video deblocking filter on GPU, Apr. 2008.

Method for unloading YUV-filtered pixels from a deblocking filter for a video decoder, Oct. 2006.

An Optimized In-Loop H.264 De-Blocking Filter on Multi-Core Engines, Feb. 2007.

U.S. Appl. No. 12/102,694, Video Compression and Encoding Method, filed Apr. 14, 2008.

U.S. Appl. No. 11/932,870, Video Compression and Encoding Method, filed Oct. 31, 2007.

ON2 Technologies, Inc., White Paper TrueMotion VP7 Video Codec, Jan. 10, 2005, 13 pages, Document Version: 1.0, Clifton Park, New York.

ON2 Technologies, Inc., White Paper On2's TrueMotion VP7 Video Codec, Jul. 11, 2008, 7 pages, Document Version: 1.0, Clifton Park, New York.

Sikora, T. et al, Shape-adaptive DCT for generic coding of video, Circuits and Systems for Video Technology, IEEE Transactions on vol. 5, Issue 1, p. 59-62, Feb. 1, 1995.

Wiegand et al, "Overview of the H 264/AVC Video Coding Standard," IEEE Transactions on Circuits and Systems for Video Technology, vol. 13, No. 7, pp. 568, 569, Jul. 1, 2003.

PCT International Search Report and Written Opinion (Date of Mailing: Apr. 21, 2010); PCT/US2009/056462, filed Sep. 10, 2009.

* cited by examiner

SYSTEM AND METHOD FOR VIDEO ENCODING USING ADAPTIVE LOOP FILTER

CROSS-REFERENCE TO RELATED APPLICATIONS

This application claims priority to U.S. provisional patent application No. 61/096,147, filed Sep. 11, 2008, which is incorporated herein in its entirety by reference.

TECHNICAL FIELD

The present invention relates in general to video encoding and more particularly, video encoding using a loop filter.

BACKGROUND

An increasing number of applications today make use of digital video for various purposes including, for example, remote business meetings via video conferencing, high definition video entertainment, video advertisements, and sharing of user-generated videos. As technology is evolving, people have higher expectations for video quality and expect high resolution video with smooth playback at a high frame rate.

There can be many factors to consider when selecting a video coder for viewing digital video. Some applications may require excellent video quality where others may need to comply with various constraints including, for example, bandwidth or storage requirements. To permit higher quality transmission of video while limiting bandwidth consumption, a number of video compression schemes are noted including proprietary formats such as VPx (promulgated by On2 Technologies, Inc. of Clifton Park, N.Y.), H.264 standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Many video coding techniques use block based prediction and quantized block transforms. With block based prediction, a reconstructed frame buffer can be used to predict subsequent frames. The use of block based prediction and quantized block transforms can give rise to discontinuities along block boundaries. These discontinuities (commonly referred to as blocking artifacts) can be visually disturbing and can reduce the effectiveness of the reference frame as a predictor for subsequent frames. These discontinuities can be reduced by the application of a loop filter. The loop filter can be applied to the reconstructed frame buffers. Some conventional loop filters apply different filtering strengths to different block boundaries. For example, some compression systems vary the strength of the loop filter based on, for example, whether the block has been inter-coded or intra-coded. Other compression systems apply a filter strength based on, for example, the difference between the extent of the discontinuity and threshold level. Further, for example, some compression systems may vary the strength of the loop filter by computing a difference value illumination change of a block compared to its neighboring block.

SUMMARY

One embodiment of the invention is disclosed as a method for reducing blocking artifacts at the boundary between adjacent blocks reconstructed from a frame of compressed video information. The video information includes a prediction stage parameter with respect to at least one of the blocks. The method includes reconstructing the at least one block based on the prediction stage parameter, computing a residual error attribute from the reconstructed block, computing a filter strength value based on a baseline filter strength and at least one incremental value. The incremental value is selected from a plurality of preset values based at least on one of the prediction stage parameter and residual error attribute associated with the at least one block. The boundary adjacent to the at least one block is filtered using the selected filter strength value.

Other embodiments of the invention are described in additional detail hereinafter.

BRIEF DESCRIPTION OF THE DRAWINGS

The description herein makes reference to the accompanying drawings wherein like reference numerals refer to like parts throughout the several views.

DETAILED DESCRIPTION

Disclosed herein are embodiments of an adaptive loop filter that remove or reduce blocking artifacts. Further, disclosed herein are embodiments of an adaptive loop filter that either remove or reduce blocking artifacts using less overhead data and/or reduce computational complexity.

Figure 1:
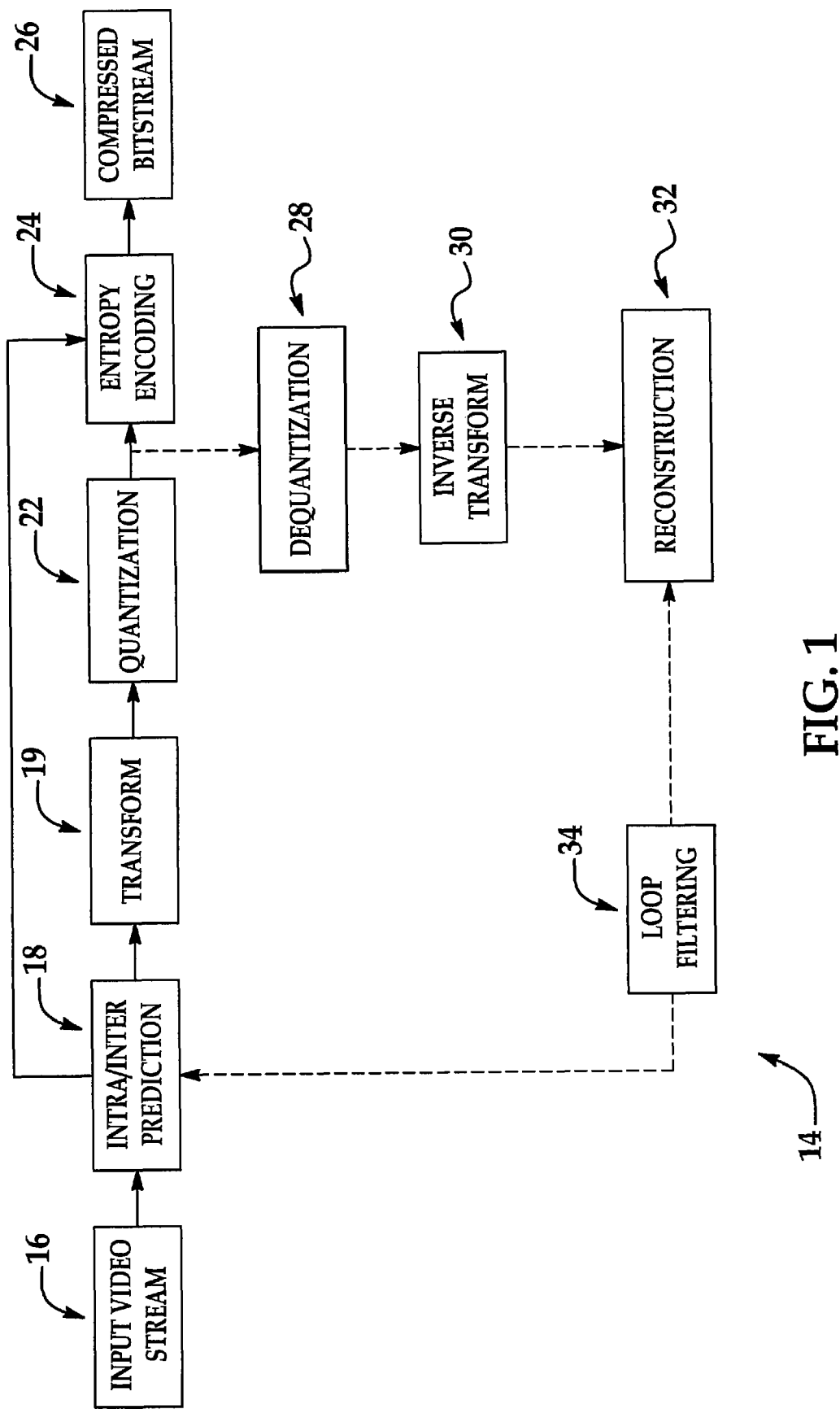
FIG. 1 is a block diagram of a video compression system in accordance with one embodiment of the present invention.

FIG. 1 is a block diagram of a video encoder 14 using an adaptive loop filter 34 according to one embodiment of the present invention.

In the disclosed embodiments, block-based video compression operates on fixed-shaped groups of neighboring pixels, called a macroblock. In general, each frame of video can be divided into macroblocks, where each macroblock consists of a plurality of smaller-sized blocks. These pixel groups within the macroblocks and blocks can be compared with either data found in the current frame or in other frames in order to formulate motion data and error signals. In this embodiment, each macroblock can be a group of 16×16 pixels. In other embodiments, macroblocks can also be any other suitable size.

Although the description of embodiments of the adaptive loop filter innovations are described in the context of the VP8 video coding format, alternative embodiments of the present invention can be implemented in the context of other video coding formats. Further, the embodiments are not limited to any specific video coding standard or format.

To remove discontinuities at block boundaries, loop filtering can be applied to reconstructed frames during a reconstruction path. As explained in more detail below, the choice of loop filter and the strength of the loop filter can have a significant effect on image quality. A filter that is too strong may cause blurring and loss of detail. A filter that it is too weak may not adequately suppress discontinuities between adjacent blocks.

Referring to FIG. 1, to encode an input video stream 16, encoder 14 performs the following functions in a forward path (shown by the solid connection lines) to produce an encoded bitstream 26: intra/inter prediction 18, transform 19, quantization 22 and entropy encoding 24. Encoder 14 also includes a reconstruction path (shown by the dotted connection lines) to reconstruct a frame for encoding of further macroblocks. Encoder 14 performs the following functions in the reconstruction path: dequantization 28, inverse transformation 30, reconstruction 32 and loop filtering 34. Other structural variations of encoder 14 can be used to encode bitstream 26.

Referring to FIG. 1, when input video stream 16 is presented for encoding, each frame within input video stream 16 can be processed in units of macroblocks. At intra/inter prediction stage 18, each macroblock can be encoded using either intra prediction or inter prediction mode. In either case, a prediction macroblock can be formed based on a reconstructed frame. In the case of intra-prediction, for example, a prediction macroblock can be formed from samples in the current frame that have been previously encoded and reconstructed. In the case of inter-prediction, for example, a prediction macroblock can be formed from one or more previous or future frames (i.e. reference frames) that have already been encoded and reconstructed. Further, alternate embodiments can encode a macroblock by using some combination of both intra prediction and inter prediction.

Next, still referring to FIG. 1, the prediction macroblock can be subtracted from the current macroblock to produce a residual macroblock (residual). Transform stage 19 transform codes the residual and quantization stage 22 quantizes the residual to provide a set of quantized transformed coefficients. The quantized transformed coefficients can be then entropy coded by entropy encoding stage 24. The entropy-coded coefficients, together with the information required to decode the macroblock, such as the type of prediction mode used, motion vectors and quantizer value, can be outputted to compressed bitstream 26.

The reconstruction path in FIG. 1 can be present to permit that both the encoder and the decoder use the same reference frames required to decode the macroblocks. The reconstruction path, similar to functions that take place during the decoding process, which are discussed in more detail below, includes dequantizing the transformed coefficients by dequantization stage 28 and inverse transforming the coefficients by inverse transform stage 30 to produce a derivative residual macroblock (derivative residual). At the reconstruction stage 32, the prediction macroblock can be added to the derivative residual to create a reconstructed macroblock. The adaptive loop filter 34 can be applied to the reconstructed macroblock to reduce blocking artifacts.

Figure 2:
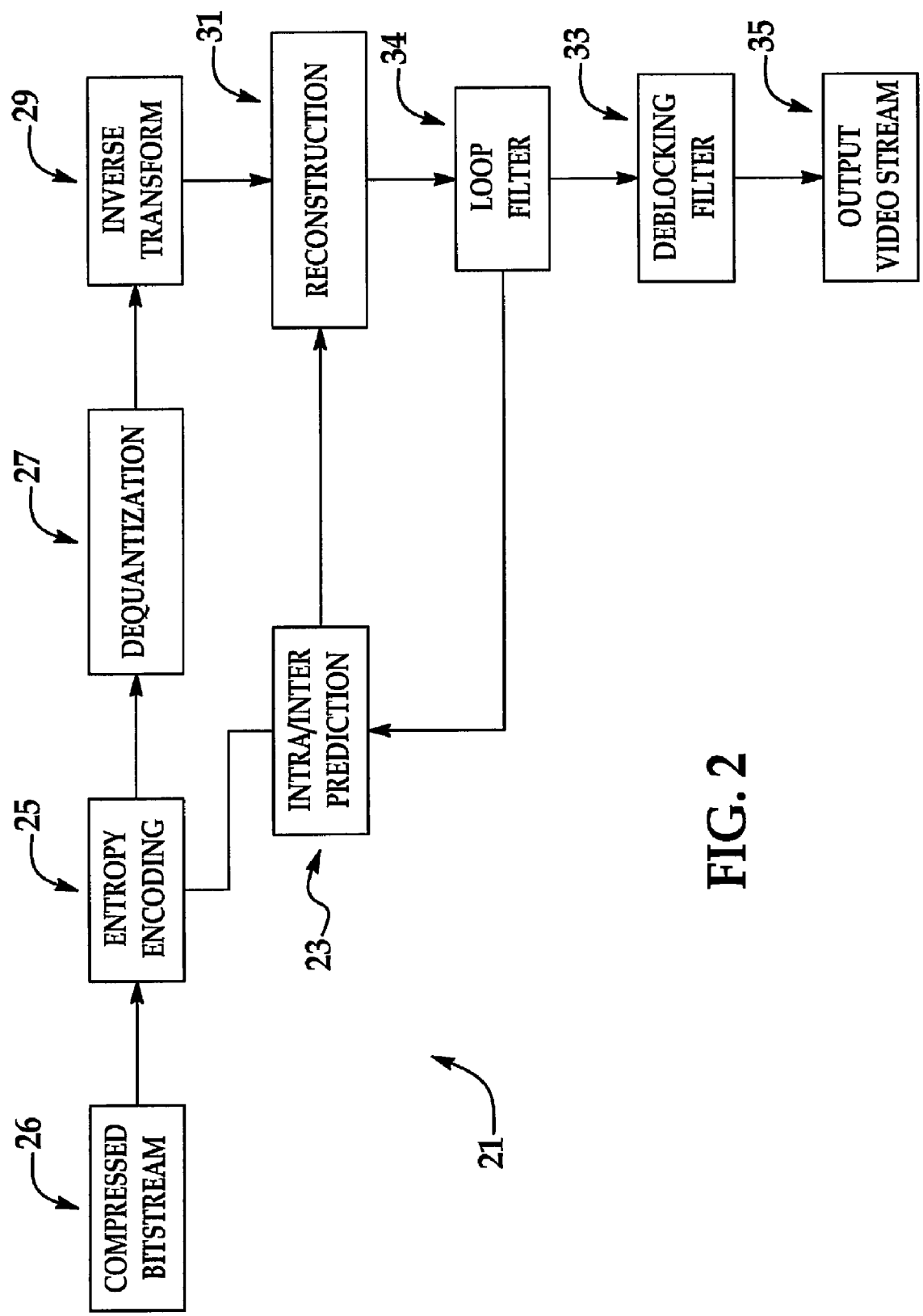
FIG. 2 is a block diagram of a video decompression system in accordance with one embodiment of the present invention.

Referring to FIG. 2, in accordance with one embodiment, to decode compressed bitstream 26, a decoder 21 having a structure similar to the reconstruction path of the encoder 14 discussed previously performs the following functions to produce an output video stream 35: entropy decoding 25, dequantization 27, inverse transformation 29, intra/inter prediction 23, reconstruction 31, adaptive loop filter 34 and deblocking filtering 33. Other structural variations of decoder 21 can be used to decode compressed bitstream 26.

When compressed bitstream 26 is presented for decoding, the data elements can be entropy decoded by entropy decoding stage 25 to produce a set of quantized coefficients. Dequantization stage 27 dequantizes and inverse transform stage 29 inverse transforms the coefficients to produce a derivative residual that is identical to that created by the reconstruction stage in the encoder 14. Using header information decoded from the compressed bitstream 26, at intra/inter prediction stage 23, decoder 21 creates the same prediction macroblock as was created in encoder 14. At the reconstruction stage 31, the prediction macroblock can be added to the derivative residual to create a reconstructed macroblock. The adaptive loop filter 34 can be applied to the reconstructed macroblock to reduce blocking artifacts. A deblocking filter 33 can be applied to the reconstructed macroblock to further reduce blocking distortion and the result can be outputted to output video stream 35.

Although the description of embodiments of the adaptive loop filter innovations are described with reference to adaptive loop filter 34 in the encoder, the described filtering techniques are also implemented in adaptive loop filter 34 in the decoder. Reference to adaptive loop filter 34 in the decoder has been omitted throughout the disclosure only to aid in understanding of the invention. However, the filtering innovations are not limited to adaptive loop filter 34 in the encoder and can be applied to adaptive loop filter 34 in the decoder or any other unit incorporating filtering techniques.

Figure 3:
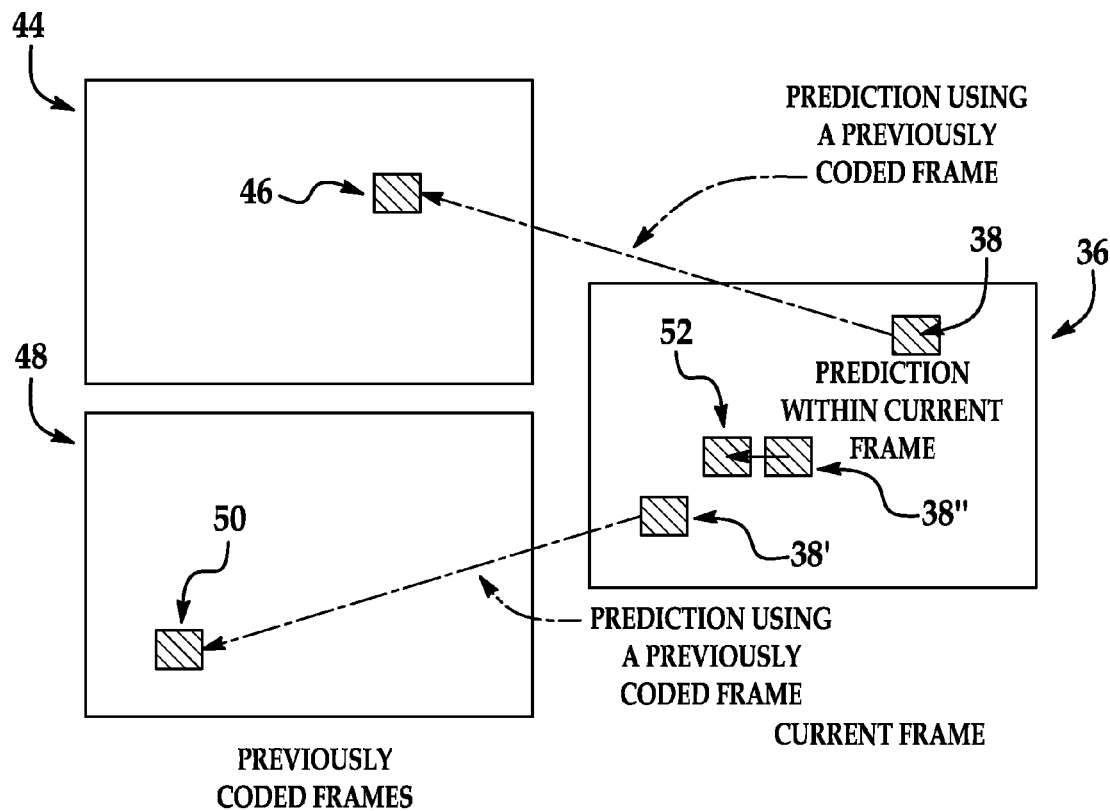
FIG. 3 is a schematic diagram of intra-prediction and inter-prediction modes used in the video compression and decompression systems of FIGS. 1 and 2.

FIG. 3 shows reference frames 44, 48 and a current frame 36 that is currently being encoded or decoded. As discussed previously, each frame can be processed in units of macroblocks and at intra/inter prediction stage 18, each macroblock can be encoded using either intra prediction, inter prediction some combination of inter prediction and intra prediction. For example, a current macroblock 38 is being encoded or decoded using inter prediction from a macroblock 46 from previously coded reference frame 44. Similarly, a current macroblock 38' is being encoded or decoded using inter prediction from a macroblock 50 from previously encoded reference frame 48. Also, for example, a current macroblock 38" is being encoded or decoded using intra prediction from a macroblock 52 within current frame 36.

Blocking artifacts can be created during the encoding process and can originate from, for example, intra/inter prediction stage 18, transform stage 19 or quantization stage 22. Since some conventional filters make filter strength dependent on block boundaries, computational processing can be complex and time-consuming.

Figure 4:
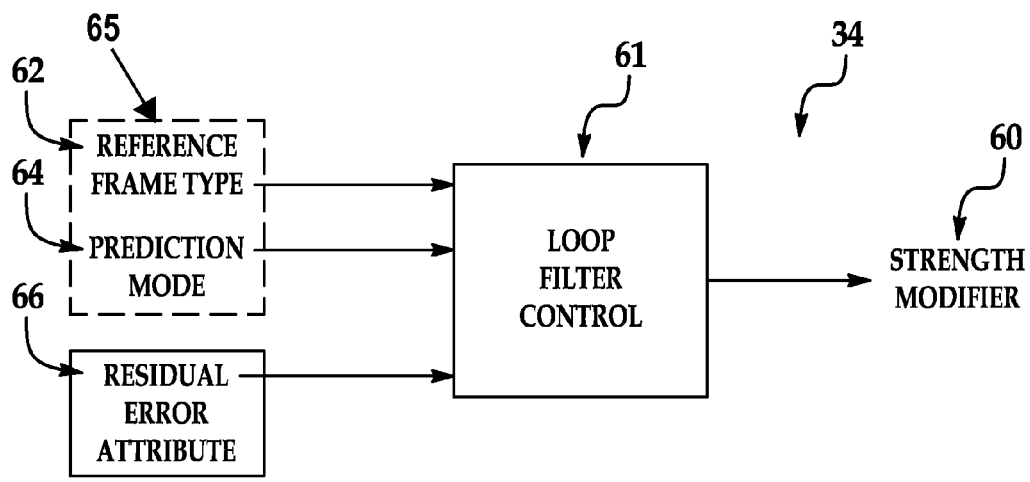
FIG. 4 is a block diagram of a loop filter control used to compute a strength modifier used in the video compression system of FIG. 1.

FIG. 4 is a block diagram illustrating a loop filter control 61 of adaptive loop filter 34 in one embodiment of the present invention. According to one embodiment, loop filter control 61 determines strength modifier 60 based on block attributes. Block attributes are based on existing encoded information about a block or information that is passed to the decoder to assist in properly decoding the bitstream.

Block attributes can include a prediction stage parameter 65 and a residual error attribute 66. Prediction stage parameter 65 can include a reference frame type 62 and a type of prediction mode 64. As discussed in more detail below, strength modifier 60 alters the levels of thresholds in adaptive loop filter 34.

Reference frame type 62 can be determined by, similar to the illustration in FIG. 3, whether intra mode or inter frame mode coding is used when constructing prediction blocks. If intra mode predictive coding is used, reference frame type 62 can be intra-frame (i.e. the current frame). When using an intra-frame, the prediction block can be formed, as discussed previously, from samples in the current frame that have been previously encoded and reconstructed.

If inter mode predictive coding is used, inter-frames can be used as a basis for formulating the prediction block. When using inter-frames, the prediction block can be formed, for example, from one or more previous frames, future frames or some combination thereof that have already been encoded and reconstructed. Accordingly, when using inter-frames, reference frame type 62 may include, for example, a last frame, a golden frame or an alternate reference frame. The last frame can be the previously encoded frame before the current frame. The golden frame can be a past frame chosen arbitrarily from the distant past to use as a predictor for subsequent frames. The alternate reference frame may include any frame that is not the last frame or the golden frame. For example, the alternate reference can be a past frame, a future frame, or a constructed reference frame. Further, for example, the constructed reference may be the reference frame as disclosed in patent application titled "System and Method for Video Encoding Using Constructed Reference Frame" that is assigned to the assignee of the present invention, is filed concurrently herewith and which is hereby incorporated by reference in its entirety.

Type of prediction mode 64 can be determined, similar to reference frame type 62, by whether intra mode or inter frame mode coding is used when constructing prediction blocks (as illustrated in FIG. 3). If intra mode predictive coding is used, two types of intra-coding can be supported, which are denoted as non-split mode and split mode. If inter mode predictive coding is used, two types of inter-coding can be supported, which are denoted as non-split mode and split mode.

If inter mode predictive coding is used with non-split mode, residual error attribute 66 can be determined by whether the resulting motion vector is null or is non-zero.

As discussed previously, a macroblock can be an array of 16×16 luminance pixels. In intra-coding, each macroblock can be further split into, for example, 4×4 luminance samples referred to as 4×4 sub-blocks. Accordingly, a macroblock can be made of 16 4×4 sub-blocks. This means that a prediction block may be formed for either a macroblock (i.e. non-split mode) or each of the 16 4×4 sub-blocks (i.e. split mode). Other sub-block sizes are also available such as 16×8, 8×16, and 8×8. Although the description of embodiments for intra-coding arc is described with reference to 4×4 sub-block split mode, any other sub-block size can be used with split mode, and the description of the embodiments is not limited to a 4×4 sub-block.

In intra-coding, non-split mode results in prediction of the whole 16×16 macroblock whereas split mode leads to separately predicting each 4×4 sub-block.

For intra-coding non-split mode, for example, one of four prediction modes can be utilized to reference neighboring pixel samples of previously-coded blocks which are to the left and/or above the 16×16 block to be predicted. The four selectable prediction modes may be vertical prediction, horizontal prediction, DC prediction and plane prediction.

For intra-coding split mode, for example, one of nine prediction modes can be utilized to reference neighboring pixel samples of previously-coded blocks which are to the left and/or above the 4×4 sub-block to be predicted. The nine selectable prediction modes may be vertical prediction, horizontal prediction, DC prediction, diagonal down-left prediction, diagonal down-right prediction, vertical-right prediction, horizontal-down prediction, vertical-left prediction and horizontal-up prediction.

In inter-coding, non-split mode results in calculating one or motion vectors based on displacing an area of a corresponding reference frame for prediction of the whole 16×16 macroblock. Alternatively, split mode results in calculating a motion vector based on displacing an area of a corresponding reference frame for prediction of a partition of the 16×16 macroblock. The 16×16 macroblock may be split into partitions of 16×8, 8×16, 8×8 or 4×4 each with its own motion vector. Other partition sizes are also available.

A motion vector can be calculated for each whole macroblock or each separate partition. In particular, motion compensation predicts pixel values of the macroblock (or the corresponding partition within the macroblock) from a translation of the reference frame. The motion vector for each macroblock or partition may either be null, which indicates there has been no change in motion, or non-zero, which indicates there has been a change in motion.

Although the description of embodiments describes how adaptive loop filter 34 applies a different strength modifier 60 based on the prediction stage parameter 65 and residual error attribute 64, any other loop filter attribute may be varied such as the filter type, filter coefficients, and filter taps, and the description of the embodiments is not limited to varying strength modifier 60.

Figure 5:
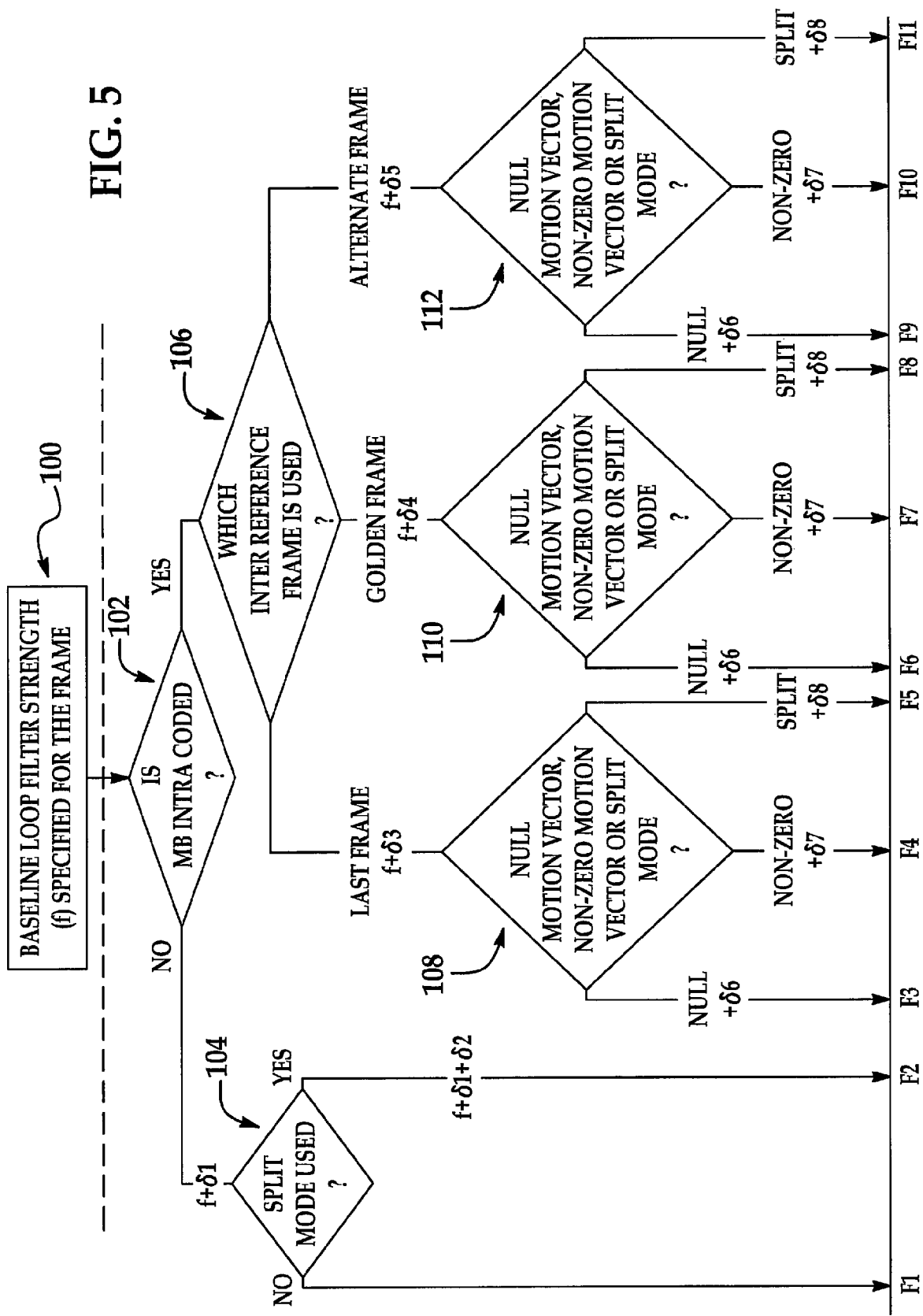
FIG. 5 is a flowchart diagram of a method of selecting the strength modifier of FIG. 4.

FIG. 5 is a flowchart showing the operation of loop filter control 61 from FIG. 4 according to one embodiment of the present invention. Referring to FIG. 5, at block 100, a baseline loop filter strength f can be selected for the frame that defines the behavior of adaptive loop filter 34. Accordingly, baseline filter strength f will be specified at the frame level in the encoded bitstream. By specifying the baseline filter strength f at the frame level, overhead can be reduced since very few bits can be used to specify a single baseline filter value f for a whole frame. However, even though only one baseline filter strength f can be specified for the frame, filtering quality is not compromised since a filter strength value/modifier 60 alters the levels of thresholds in adaptive loop filter 34, as discussed below.

To adjust strength modifier 60 at the macroblock level, delta values 1-8 can be encoded in the bitstream. These delta values are, for example, added to baseline filter strength f. Other suitable procedures for combining baseline filter strength f and strength modifier 60 are also available. Delta values may also be incremental values or percentage increase/decrease values or the like. Delta values may also be positive, negative or zero. Application of the deltas according to the flowchart of FIG. 5 gives rise to 11 different strength modifiers 60 identified as F1-F11.

At decision block 102, control 61 determines whether the current macroblock being reconstructed has been intra-coded.

If the current macroblock has been intra-coded, delta 1 can be added to baseline filter strength f. Referring back to FIG. 4, in this case, reference frame type 62 is an intra-frame. Then, control 61 moves to decision block 104.

At decision block 104, control 61 determines whether intra-coding split mode is being used. If intra-coding split mode is being used, delta 2 can be added to delta 1 and baseline filter strength f to yield strength modifier F2. Referring back to FIG. 4, in this case, prediction mode 64 is intra-coding split mode.

If intra-coding split mode is not being used (i.e. non-split mode), only delta 1 can be added to baseline filter strength f to yield strength modifier F1. Referring back to FIG. 4, in this case, prediction mode 64 is intra-coding non-split mode.

If the current macroblock has not been intra-coded, control 61 moves to decision block 106 to determine the type of inter-coded reference frame used. If the last frame is used, delta 3 can be added to baseline filter strength f. Referring back to FIG. 4, in this case, reference frame type 62 is the last frame. Then, control 61 moves to decision block 108.

If a golden frame is used, delta 4 can be added to baseline filter strength f. Referring back to FIG. 4, in this case, reference frame type 62 is the golden frame. Then, control 61 moves to decision block 110.

If an alternate frame is used, delta 5 can be added to baseline filter strength f. Referring back to FIG. 4, in this case, reference frame type 62 is an alternate frame. Then, control 61 moves to decision block 112.

As discussed previously, if the last frame is used, control 61 determines prediction mode 64 at decision block 108. If inter-coding split mode is being used, delta 8 can be added to baseline filter strength f and delta 3 to yield strength modifier F5. Referring back to FIG. 4, in this case, prediction mode 64 is inter-coding split mode.

If inter-coding split mode is not being used, control 61 determines whether the calculated motion vector is null or non-zero. If the motion vector is null, delta 6 can be added to baseline filter strength f and delta 3 to yield strength modifier F3. Referring back to FIG. 4, in this case, prediction mode 64 is inter-coding non-split mode, and residual error attribute 66 is a null motion vector. If the motion vector is non-zero, delta 7 can be added to baseline filter strength f and delta 3 to yield strength modifier F4. Referring back to FIG. 4, in this case, prediction mode 64 is inter-coding non-split mode, and residual error attribute 66 is a non-zero motion vector.

As discussed previously, if a golden frame is used, control 61 determines prediction mode 64 at decision block 110. If inter-coding split mode is being used, delta 8 can be added to baseline filter strength f and delta 4 to yield strength modifier F8. Referring back to FIG. 4, in this case, prediction mode 64 is inter-coding split mode.

If inter-coding split mode is not being used with the golden frame, control 61 determines whether the calculated motion vector is null or non-zero. If the motion vector is null, delta 6 can be added to baseline filter strength f and delta 4 to yield strength modifier F6. Referring back to FIG. 4, in this case, prediction mode 64 is inter-coding non-split mode, and residual error attribute 66 is a null motion vector. If the motion vector is non-zero, delta 7 can be added to baseline filter strength f and delta 4 to yield strength modifier F7. Referring back to FIG. 4, in this case, prediction mode 64 is inter-coding non-split mode, and residual error attribute 66 is a non-zero motion vector.

As discussed previously, if an alternate frame is used, control 61 determines prediction mode 64 at decision block 112. If inter-coding split mode is being used, delta 8 can be added to baseline filter strength f and delta 5 to yield strength modifier F11. Referring back to FIG. 4, in this case, prediction mode 64 is inter-coding split mode.

If inter-coding split mode is not being used with the alternate frame, control 61 determines whether the calculated motion vector is null or non-zero. If the motion vector is null, delta 6 can be added to baseline filter strength f and delta 5 to yield strength modifier F9. Referring back to FIG. 4, in this case, prediction mode 64 is inter-coding non-split mode, and residual error attribute 66 is a null motion vector. If the motion vector is non-zero, delta 7 can be added to baseline filter strength f and delta 5 to yield strength modifier F10. Referring back to FIG. 4, in this case, prediction mode 64 is inter-coding non-split mode, and residual error attribute 66 is a non-zero motion vector.

Generally, different levels of strength modifier 60 are applied to blocking artifacts the extent of which are more or less likely to be present depending on reference frame type 62 and prediction mode 64. As illustrated in FIG. 5, for example, a different strength modifier 60 can be applied to intra-coded macroblocks rather than inter-coded macroblocks (i.e. F1-F2 vs. F3-F11). Further, a different strength modifier 60 can be applied to intra-coded non-split mode macroblocks rather than intra-coded split-mode macroblocks (i.e. F1 vs. F2). Other suitable schemes to adjust strength modifier 60 are also available.

Figure 6:
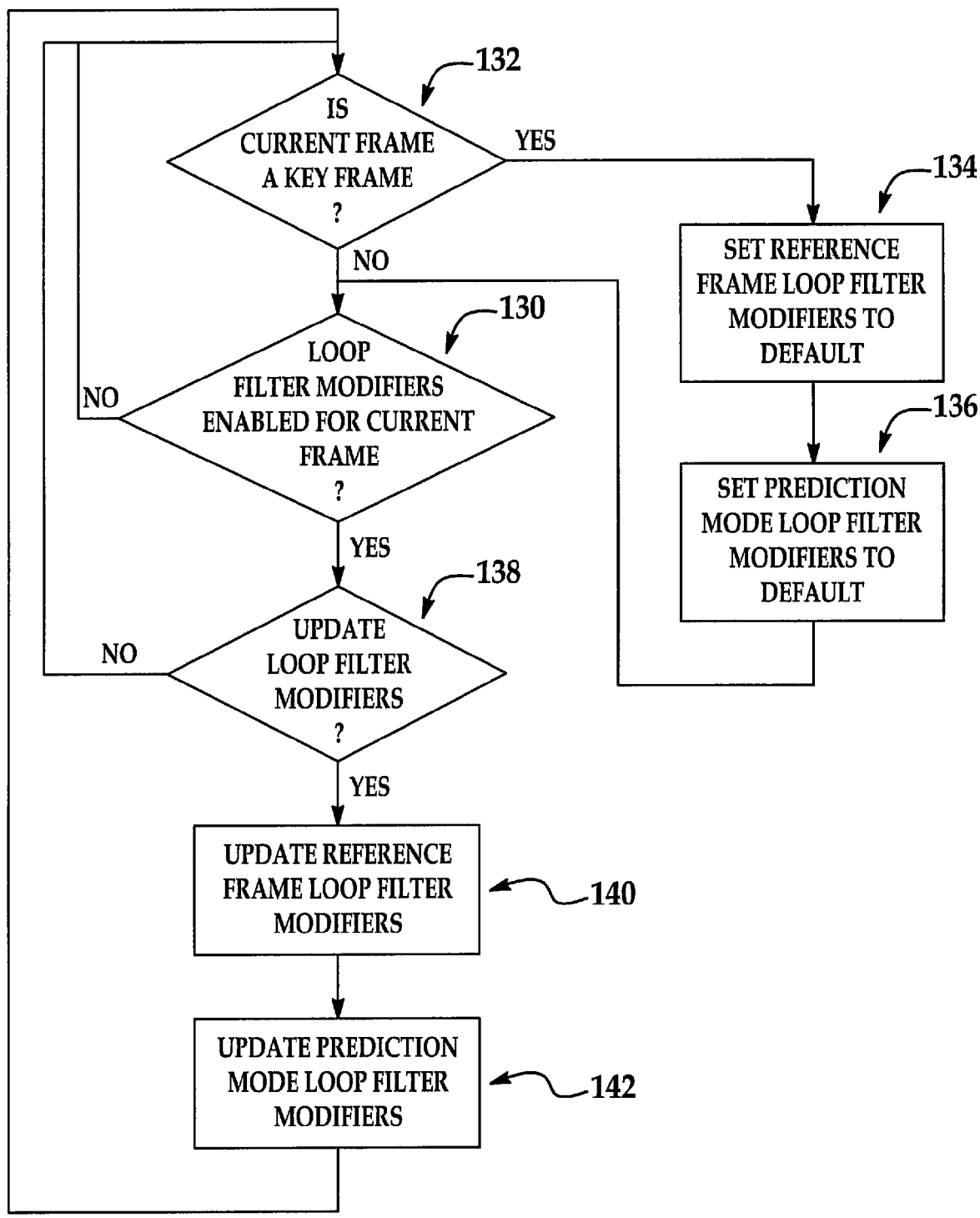
FIG. 6 is a flowchart diagram of a method of updating loop filtering video data used in the video compression system of FIG. 1.

FIG. 6 is a flowchart of a method of updating loop filtering video data according to one embodiment of the present invention. The loop filtering video data can include both the reference frame loop filter modifiers as well as the prediction mode loop filter modifiers. The reference frame loop filter modifiers can include the delta values for the reference frame type 62. The prediction mode loop filter modifiers can include the delta values for both prediction mode 64 and the residual error attribute 66.

Referring again to FIG. 6, at decision block 132, adaptive loop filter 34 determines whether the current frame is a frame coded without reference to any other frame except itself (commonly referred to as a key frame). If the current frame is a key frame, adaptive loop filter 34 moves to block 134 to set reference frame loop filter modifiers to default values. Then, at block 136, adaptive loop filter 34 sets prediction mode loop filter modifiers to default values. Once the values have been set to default, adaptive loop filter moves to decision block 130 to determine whether a filter condition is enabled at the frame level.

If current frame is a key frame and the values have been set to default or if the current frame is not a key frame, adaptive loop filter 34 moves to decision block 130 to determine whether a filter condition is enabled at the frame level. Adaptive loop filter 34 can determine whether loop filter modifiers are enabled through a single bit, a byte, a flag or the like.

If loop filter modifiers are not enabled (i.e. a single loop filter condition has been detected), loop filtering in adaptive loop filter 34 stage can be skipped for the current frame. In other words, a single loop filter strength can be applied to all the blocks within the frame. A single loop filter strength can also include not applying a loop filter for any part of the frame.

Once loop filtering has been skipped for the current frame, adaptive loop filter will return to decision block 130 to determine whether loop filter modifiers have been enabled for the next frame. Adaptive loop filter 34 may choose to skip loop filtering based on one or more characteristics of the residual error signal, reference frame type 62, prediction mode 64 or some combination thereof. Other suitable factors to skip loop filtering in adaptive loop filter 34 are also available.

For example, loop filtering may be skipped when there is no AC component of the residual macroblock in transform stage 19 and where the macroblock is inter-coded with a null motion vector. Skipping loop filtering in this instance will prevent repeated loop filtering over several frames in regions of the image where there is no motion. Accordingly, blurring will be reduced and less computations will be involved, reducing the overall computational complexity.

Still referring to FIG. 6, if loop filter modifiers are enabled, adaptive loop filter 34 moves to decision block 138 to determine whether a loop filter strength value condition has been detected. More specifically, at decision block 138, adaptive loop filter 34 determines whether there have been any updates to the loop filter modifiers that have been encoded in the current frame. Adaptive loop filter 34 can determine whether loop filter modifiers are to be updated through a single bit, a byte, a flag or the like.

If there are no updates to loop filter modifiers, adaptive loop filter 34 uses the preset loop filter modifiers from the previous frame to apply to the current frame. Once the previous values have been applied, adaptive loop filter will return to decision block 130 to determine whether loop filter modifiers have been enabled for the next frame.

If there are updates to loop filter modifiers, adaptive loop filter 34 will update the preset values of reference frame loop filter modifiers at block 140. Then, adaptive loop filter 34 will move to block 142 to update the preset values of prediction mode loop filter modifiers. Once the values have been updated, adaptive loop filter 34 will return to decision block 130 to determine whether loop filter modifiers have been enabled for the next frame.

Referring back to FIG. 5, reference frame loop filter modifiers and prediction mode loop filter modifiers can be delta values 1-8 applied at each of the junctions of the flowcharts. Specifically, delta values 1, 3, 4 and 5 can be reference frame loop filter modifiers corresponding to reference frame type 62, delta values 2 and 8 can be prediction mode loop filter modifiers corresponding to prediction mode 64 and delta values 6 and 7 can be prediction mode loop filter modifiers corresponding to residual error attribute 66. Each of these delta values can be updated in adaptive loop filter 34 using the method shown in the flowchart of FIG. 6

Figure 7:
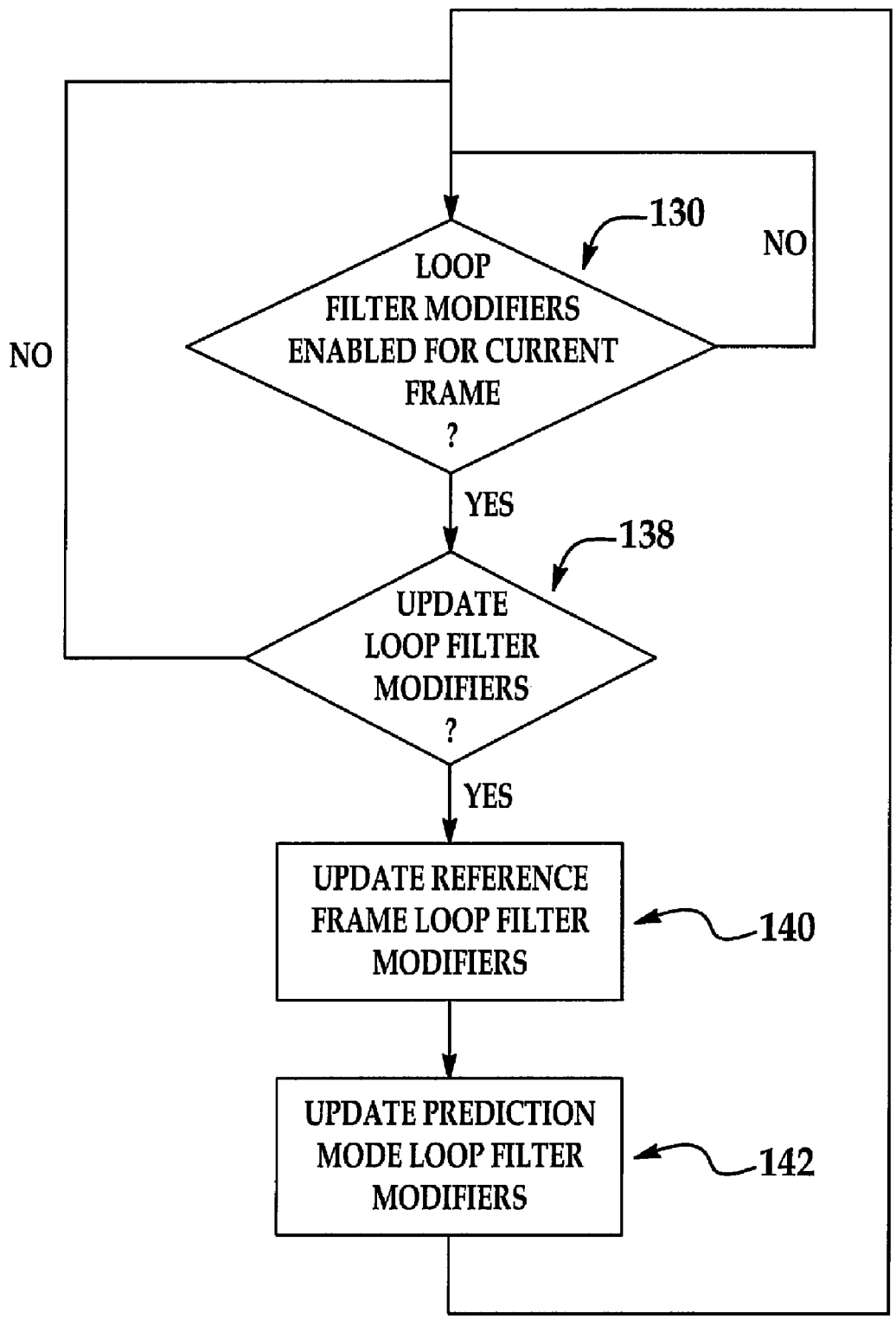
FIG. 7 is a flowchart diagram of another method of updating loop filtering video data used in the video compression system of FIG. 1.

FIG. 7 is a flowchart of a method of updating loop filtering video data according to one embodiment of the present invention. FIG. 7 is similar to the flowchart of FIG. 6 except that adaptive loop filter 34 does not determine whether the current frame is a key frame. Accordingly, if loop filter modifiers are enabled and there are updates to those loop filter modifiers, all frames may update the reference frame loop filter modifiers and prediction mode loop filter modifiers.

Exemplary pseudo code for implementing the steps of the method in FIG. 7 is shown in Table 1.

TABLE 1

```
// Indicate if Loop modifiers enabled
WriteBit( LoopModifiersEnabled );
if ( LoopModifiersEnabled )
{
  // Are any updates needed
  WriteBit( UpdateLoopModifiers );
  if (UpdateLoopModifiers)
  {
    // Reference frame loop filter modifiers
    for ( i = 0; i < REF_MODIFIERS; i++ )
    {
      Data = RefLfModifiers[i];
      if ( Data )
      {
      Onyx_WriteBit(1);
      // Sign bit
      if ( Data > 0 )
        Onyx_WriteBit(0);
      else
      {
        Onyx_WriteBit(1);
        Data = -Data;
      }
      // 6 bit magnitude
      WriteLiteral( (Data & 0x3F), 6 );
      }
      else
        Onyx_WriteBit(0);
    }
    // Prediction mode loop filter modifiers
    for ( i = 0; i < PREDICTION_MODE_MODIFIERS; i++ )
    {
      Data = PredictionModeModifiers[i];
      if ( Data )
      {
```

TABLE 1-continued

```
      Onyx_WriteBit(1);
      // Sign bit
      if ( Data > 0 )
        Onyx_WriteBit(0);
      else
      {
        Onyx_WriteBit(1);
        Data = -Data;
      }
      // 6 bit magnitude
      WriteLiteral( (Data & 0x3F), 6 );
      }
      else
        Onyx_WriteBit(0);
    }
  }
}
```

The aforementioned pseudo code is not intended to be limited to any particular programming language and implementation thereof. It will be appreciated that a variety of programming languages and implementations thereof may be used to implement the teachings of embodiments of the invention as described herein.

Referring to FIGS. 6 and 7 and the aforementioned pseudo code, embodiments of the present invention decrease the amount of overhead in the bitstream. For example, determining whether loop filter modifiers are enabled can be accomplished through a single bit. Further, for example, determining whether updates to loop filter modifiers are enabled can also be accomplished through a single bit.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for reducing blocking artifacts at the boundary between adjacent blocks reconstructed from a frame of compressed video information that includes a prediction stage parameter with respect to at least one of the blocks, the method comprising:

reconstructing the at least one block based on the prediction stage parameter;

computing a residual error attribute from the reconstructed block;

categorizing the at least one block into one of a plurality of categories based on at least one of the prediction stage parameter or the residual error attribute;

identifying one or more filter modifiers for the category in which the at least one block is categorized based on at least one of the prediction stage parameter or the residual error attribute associated with that category;

computing a filter strength value based on a baseline filter strength and, the identified one or more filter modifiers; and filtering the boundary adjacent to the at least one block using the selected computed filter strength value.

2. The method of claim 1, wherein the prediction stage parameter includes at least one of a reference frame type and a prediction mode.

3. The method of claim 2, wherein the reference frame type is one of intra-frame, last frame, golden frame and alternate reference frame.

4. The method of claim 2, wherein the prediction mode is one of non-split mode and split mode.

5. The method of claim 1, wherein the residual error attribute is one of a null motion vector and a non-zero motion vector.

6. The method of claim 1 wherein the one or more loop filter modifiers are determined at the frame level.

7. The method of claim 6, further comprising:
determining whether the frame being decoded is a key frame; and wherein at least some of the loop filter modifiers are set to a default value if the frame being decoded is a key frame.

8. The method of claim 6, further comprising:
determining whether the frame being decoded specifies a loop filter strength value condition, wherein the loop filter strength value condition indicates that a pre-determined loop filter strength value is to be used for the plurality of categories; and
if the frame being decoded specifies a loop filter strength value condition, then assigning the pre-determined loop filter strength value to the plurality of categories.

9. The method of claim 6, further comprising:
determining whether the frame being decoded specifies a single loop filter condition; and
if the frame being decoded specifies a single loop filter condition, then assigning a single loop filter strength value to blocks of the frame without regard to the prediction stage parameter and residual error attribute associated with the at least one block.

10. A method for decoding frames of compressed video information, each frame including a plurality of blocks having a prediction stage parameter and a residual error attribute, the method comprising:
categorizing the blocks of at least one of the frames into categories based on at least one of the prediction stage parameter or the residual error attribute;
determining a loop filter strength value for each of the categories using the steps of:
determining a baseline loop filter strength value specified in the at least one frame,
identifying one or more loop filter modifiers for the given category based on at least one of the prediction stage parameter or the residual error attribute associated with that category, and
determining the loop filter strength value based on the one or more identified loop filter modifiers and the baseline loop filter strength value; and
filtering the boundary adjacent to at least one of the blocks using the loop filter strength value assigned to the category in which that block is categorized.

11. The method of claim 10, wherein determining the loop filter strength value further includes:
adding the one or more loop filter modifiers to the baseline loop filter strength value.

12. The method of claim 10, wherein the prediction stage parameter includes at least one of a reference frame type or a prediction mode.

13. The method of claim 12, wherein the reference frame type is one of intra-frame, last frame, golden frame and alternate reference frame.

14. The method of claim 12, wherein the prediction mode is one of non-split mode and split mode.

15. The method of claim 10, wherein the residual error attribute is one of a null motion vector and a non-zero motion vector.

16. The method of claim 10, wherein the loop filter modifiers are determined based on delta values specified in at least one of the frames.

17. The method of claim 16, further comprising:
determining whether the frame being decoded is a key frame; and wherein at least some of the loop filter modifiers are set to a default value if the frame being decoded is a key frame.

18. The method of claim 17, further comprising:
determining whether the frame being decoded specifies a loop filter strength value condition for one or more of the categories, wherein the loop filter strength value condition indicates that a pre-determined loop filter strength value is to be used for the one or more categories; and
if the frame being decoded specifies the loop filter strength value condition for one or more of the categories, then assigning the pre-determined loop filter strength value to the one or more categories.

19. The method of claim 10, further comprising:
determining whether one or more of the frames being decoded specify a single loop filter condition; and
if the one or more frames being decoded specify a single loop filter condition, then assigning a single loop filter strength value to blocks of the one or more frames without regard to category.

20. The method of claim 10, wherein identifying the one or more loop filter modifiers includes:
identifying a first loop filter modifier based on the prediction stage parameter; and
identifying a second loop filter modifier based on the residual error attribute.

21. The method of claim 20, wherein determining the loop filter strength value includes adding the baseline loop filter strength value, the first loop filter modifier, and the second loop filter modifier.

22. A method for decoding a video stream including a plurality of frames, at least some frames having a plurality of blocks, the method comprising:
decoding, from the video stream, a baseline filter strength value associated with a current frame of the plurality of frames;
determining a plurality of loop filter modifiers for the current frame based on one or more delta values decoded from the video stream;
decoding a prediction stage parameter and a residual error attribute associated with a block of the current frame;
selecting one or more of the loop filter modifiers based on at least one of the prediction stage parameter or the residual error attribute;
determining a loop filter strength based on the selected loop filter modifiers and the baseline filter strength value; and
applying a filter to the block at the determined loop filter strength.

23. The method of claim 22, wherein determining the plurality of loop filter modifiers for the current frame is further based on a combination of one or more delta values associated with a previous frame and one or more delta values associated with the current frame.

24. The method of claim 22, wherein the plurality of loop filter modifiers includes at least one of filter type, filter coefficients, or filter taps and applying the filter to the block is based on the filter type, filter coefficients, or filter taps included in the selected loop filter modifiers.

* * * * *